United States Patent
Kong

(10) Patent No.: US 10,234,100 B2
(45) Date of Patent: Mar. 19, 2019

(54) OPTICAL LENS, LIGHT EMITTING DEVICE, AND LIGHT EMITTING MODULE HAVING SAME

(71) Applicant: LG INNOTEK CO., LTD., Seoul (KR)

(72) Inventor: Sung Min Kong, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/738,075

(22) PCT Filed: Jun. 22, 2016

(86) PCT No.: PCT/KR2016/006610
§ 371 (c)(1),
(2) Date: Dec. 19, 2017

(87) PCT Pub. No.: WO2016/208957
PCT Pub. Date: Dec. 29, 2016

(65) Prior Publication Data
US 2018/0306405 A1    Oct. 25, 2018

(30) Foreign Application Priority Data

Jun. 23, 2015    (KR) .................. 10-2015-0088816

(51) Int. Cl.
*F21V 5/04*    (2006.01)
*G02B 27/09*    (2006.01)
(Continued)

(52) U.S. Cl.
CPC ............. *F21V 5/04* (2013.01); *G02B 3/08* (2013.01); *G02B 7/022* (2013.01);
(Continued)

(58) Field of Classification Search
CPC ............. G02B 27/0955; H04N 5/2254; H04N 5/2354; H05B 33/0857
(Continued)

(56) References Cited

U.S. PATENT DOCUMENTS 6,296,376 B1 * 10/2001 Kondo ................. F21V 5/02
362/310
8,459,845 B2 * 6/2013 Chang ................. B62J 6/02
362/296.05
(Continued)

FOREIGN PATENT DOCUMENTS

JP    2010-272565    12/2010
KR    10-0638566    10/2006
(Continued)

OTHER PUBLICATIONS

International Search Report (with English Translation) and Written Opinion dated Oct. 13, 2016 issued in Application No. PCT/KR2016/006610.

*Primary Examiner* — Laura K Tso
(74) *Attorney, Agent, or Firm* — Ked & Associates, LLP

(57) ABSTRACT

Embodiments disclose an optical lens and a light emitting module having the same. The disclosed light emitting module includes: an optical lens including a light-transmitting first body, an incident part including an incident surface and a pattern on a periphery of the incident surface under the first body, and an emitting part protruding from an upper surface of the first body; a light emitting device having a second body having a cavity in which the incident part of the optical lens is disposed, a light emitting diode in the cavity, and a recess in which an outer lower surface of the first body faces a periphery of the cavity; and an adhesive for bonding the outer lower surface of the first body of the optical lens to the recess of the light emitting device, wherein a lower portion of the first body is disposed in the recess.

20 Claims, 13 Drawing Sheets

(51) Int. Cl.
*H04N 5/225* (2006.01)
*H04N 5/235* (2006.01)
*H05B 33/08* (2006.01)
*G02B 19/00* (2006.01)
*G02B 7/02* (2006.01)
*G02B 3/08* (2006.01)

(52) U.S. Cl.
CPC ..... *G02B 19/0066* (2013.01); *G02B 27/0955* (2013.01); *H04N 5/2254* (2013.01); *H04N 5/2256* (2013.01); *H04N 5/2354* (2013.01); *H05B 33/0857* (2013.01)

(58) Field of Classification Search
USPC ........................................ 362/311.02, 249.02
See application file for complete search history.

(56) References Cited

U.S. PATENT DOCUMENTS

| | | | | |
|---|---|---|---|---|
| 8,591,074 | B1* | 11/2013 | Jiang | ..................... F21V 7/0091 362/311.02 |
| 2011/0133232 | A1 | 6/2011 | Yoshioka et al. | |
| 2012/0056227 | A1 | 3/2012 | Lee et al. | |
| 2013/0314925 | A1* | 11/2013 | Jiang | ........................ F21V 5/04 362/311.02 |
| 2014/0117391 | A1 | 5/2014 | Ha et al. | |
| 2014/0168994 | A1* | 6/2014 | Wang He | .................. F21V 5/04 362/311.02 |
| 2014/0168996 | A1* | 6/2014 | Kajiwara | .................. F21V 5/04 362/311.02 |
| 2015/0369448 | A1* | 12/2015 | Clauss | .................. F21V 31/005 362/311.02 |

FOREIGN PATENT DOCUMENTS

| | | |
|---|---|---|
| KR | 10-2009-0104511 | 10/2009 |
| KR | 10-2010-0068584 | 6/2010 |
| KR | 10-2012-0022410 | 2/2012 |
| KR | 10-2014-0056571 | 5/2014 |
| KR | 10-2014-0088744 | 7/2014 |
| KR | 10-2014-0140230 | 12/2014 |

* cited by examiner

OPTICAL LENS, LIGHT EMITTING DEVICE, AND LIGHT EMITTING MODULE HAVING SAME

CROSS-REFERENCE TO RELATED PATENT APPLICATIONS

This application is a U.S. National Stage Application under 35 U.S.C. § 371 of PCT Application No. PCT/KR2016/006610, filed Jun. 22, 2016, which claims priority to Korean Patent Application No. 10-2015-0088816, filed Jun. 23, 2015, whose entire disclosures are hereby incorporated by reference.

TECHNICAL FIELD

An embodiment relates to an optical lens.

An embodiment relates to a light emitting device having a plurality of light emitting chips having different correlated color temperatures.

An embodiment relates to a light emitting module having an optical lens and a light emitting device under the optical lens.

BACKGROUND ART

Light emitting devices, for example, light emitting diodes, are one type of semiconductor devices that convert electrical energy into light, and are gaining much attention as a next generation light source as substitutes for existing fluorescent lamps, incandescent lamps, or the like.

Since the light emitting diodes generate light using semiconductor devices, the light emitting diodes consume very low electricity compared to incandescent lamps that heat tungsten to generate light, or fluorescent lamps that collide ultraviolet rays generated through high voltage discharge with a fluorescent material to generate light.

In recent years, the number of mobile devices with camera functions is increasing. Such mobile devices may have a built-in flash to provide an amount of light needed during night-time image capturing. In this regard, a use of a white Light Emitting Diode (LED) as a light source for camera flash has increased. Currently, methods of using a light emitting diode as a light source of the camera flash includes using a reflector, and an outer cover, the reflector being made of a reflective surface with a high reflectance designed to match a radiation angle of a light emitting diode with a camera angle of view, integrally forming a flash lens, an instrument for fixing the flash lens, and a light emitting diode package, and the like.

The needs for a flash lens for the light emitting diode are increasing.

DISCLOSURE

Technical Problem

An embodiment provides an optical lens having a pattern of a concentric circular shape on a periphery of a plurality of incident parts.

An embodiment provides a light emitting device having a plurality of light emitting chips under an optical lens and a light emitting module including the same.

An embodiment provides a light emitting device having a plurality of light emitting chips having different correlated color temperatures and a light emitting module including the same.

An embodiment provides a light emitting device having LEDs of warm white and cool white colors and a light emitting module including the same.

An embodiment provides a light emitting module having a light emitting device with an improved adhesion area between an optical lens and the light emitting device.

An embodiment provides a light emitting module in which an emitting part of an optical lens protrudes to be coupled to an opening of a case.

Technical Solution

According to an embodiment, an optical lens includes a light-transmitting first body, an incident part including an incident surface and a pattern of concentric circle shape having different radii on a periphery of the incident surface under the first body; an emitting part protruding from an upper portion of the first body and configured to emit light incident from the incident part; and a protrusion portion protruding outside the first body, wherein the emitting part has a circular columnar shape and has a diameter smaller than a width of the first body.

According to an embodiment, a light emitting module includes: an optical lens including a light-transmitting first body, an incident part including an incident surface and a pattern on a periphery of the incident surface under the first body, and an emitting part protruding from an upper surface of the first body; a light emitting device having a second body having a cavity in which the incident part of the optical lens is disposed, a light emitting diode in the cavity, and a recess in which an outer lower surface the first body faces a periphery of the cavity; and an adhesive for bonding the outer lower surface of the first body of the optical lens to the recess of the light emitting device, wherein a lower portion of the first body is disposed in the recess.

According to an embodiment, a light emitting module includes: an optical lens; and a light emitting device having a plurality of light emitting diodes under the optical lens, wherein the optical lens includes a light-transmitting first body, and an incident part having a plurality of incident surfaces facing the plurality of light emitting diodes and a concentric pattern on a periphery of each of the plurality of incident surfaces, the light emitting device includes a second body having a cavity in which the incident part of the optical lens is disposed, a plurality of lead frames disposed on the bottom of the cavity, and a plurality of electrode pads disposed on the bottom of the second body, the plurality of lead frames include a first lead frame in which the plurality of light emitting diodes are disposed and a second and a third lead frame disposed on opposite sides of the first lead frame, and the plurality of light emitting diodes emit different correlated color temperatures.

Advantageous Effects

According to an embodiment, an optical lens may be fixed to a light emitting device.

An embodiment may adjust a correlated color temperature (CCT) using LEDs of warm light and cool light.

According to an embodiment, the emitting part of an optical lens protrudes to an opening of a case, and thus foreign substances may be prevented from entering.

According to an embodiment, a uniformity of light emitted from an optical lens may be improved.

According to an embodiment, a cover lens attached on an optical lens may be removed.

According to an embodiment, optical reliability of an optical lens for flash may be improved.

According to an embodiment, reliability of an optical lens and a flash module having the optical lens may be improved.

MODES OF THE INVENTION

In the description of the embodiments, when it is described that each layer (film), region, pattern, or structure is formed "above/on" or "below/under" a substrate, each layer (film), region, pad or pattern, the term "above/on" and "below/under" include being formed both "directly" or "indirectly (by interposing another layer)" above/on "and "below/under". Also, a standard of above/on or below/under of each layer or structure will be described with respect to the drawings.

Figure 1:
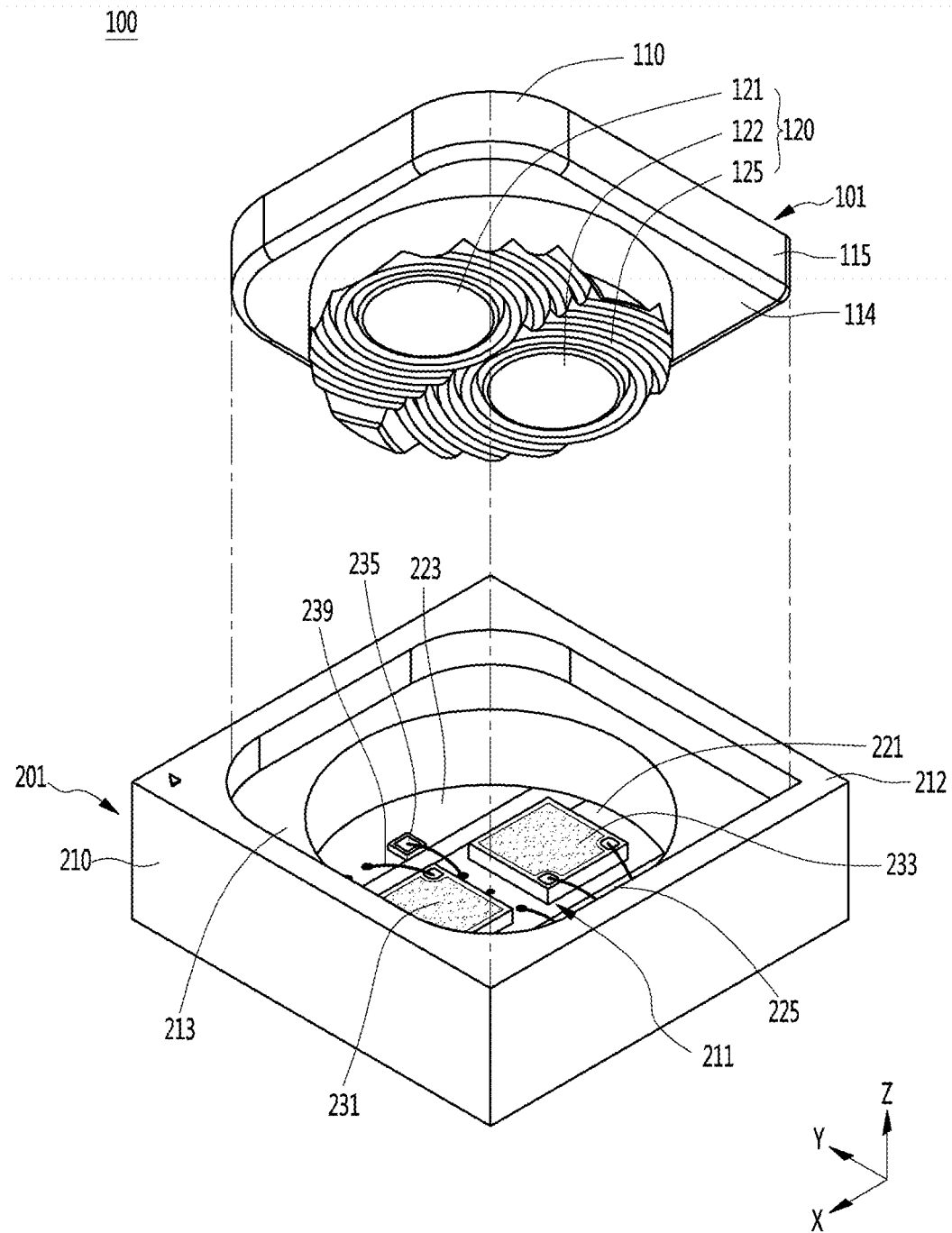
FIG. 1 is an exploded perspective view of a light emitting module according to an embodiment.
Figure 2:
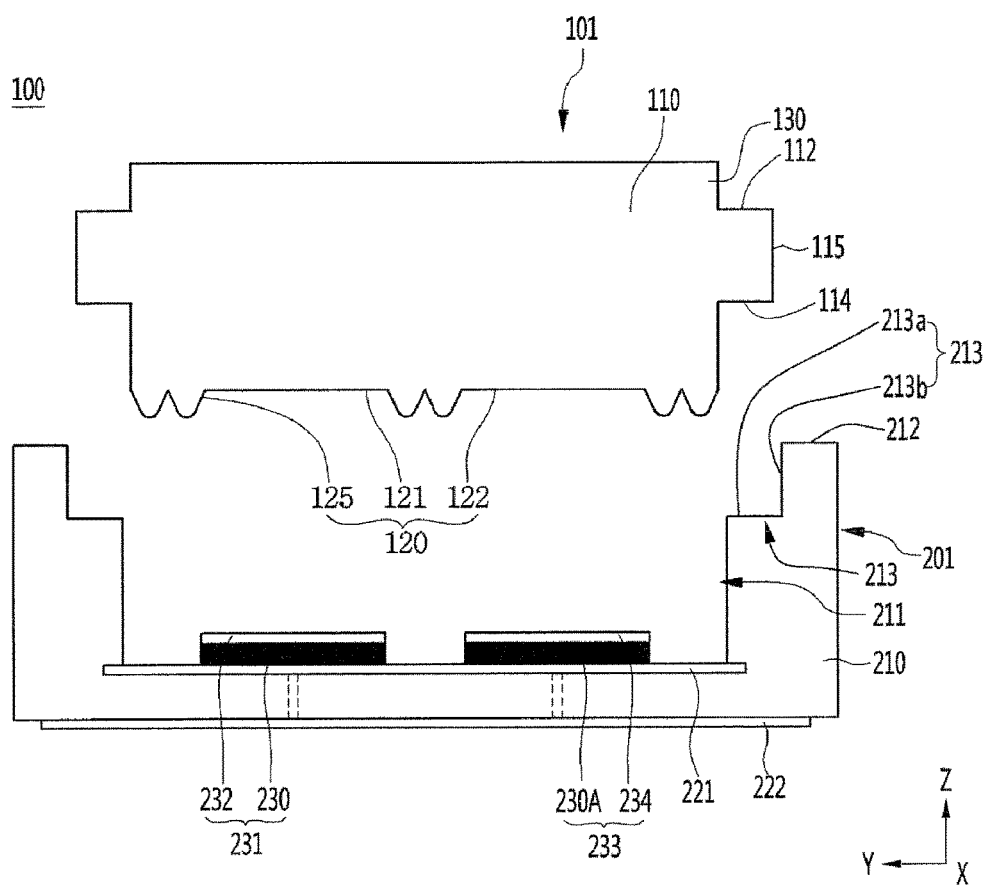
FIG. 2 is a side cross-sectional view of an optical lens and a light emitting device of the light emitting module of FIG. 1.
Figure 3:
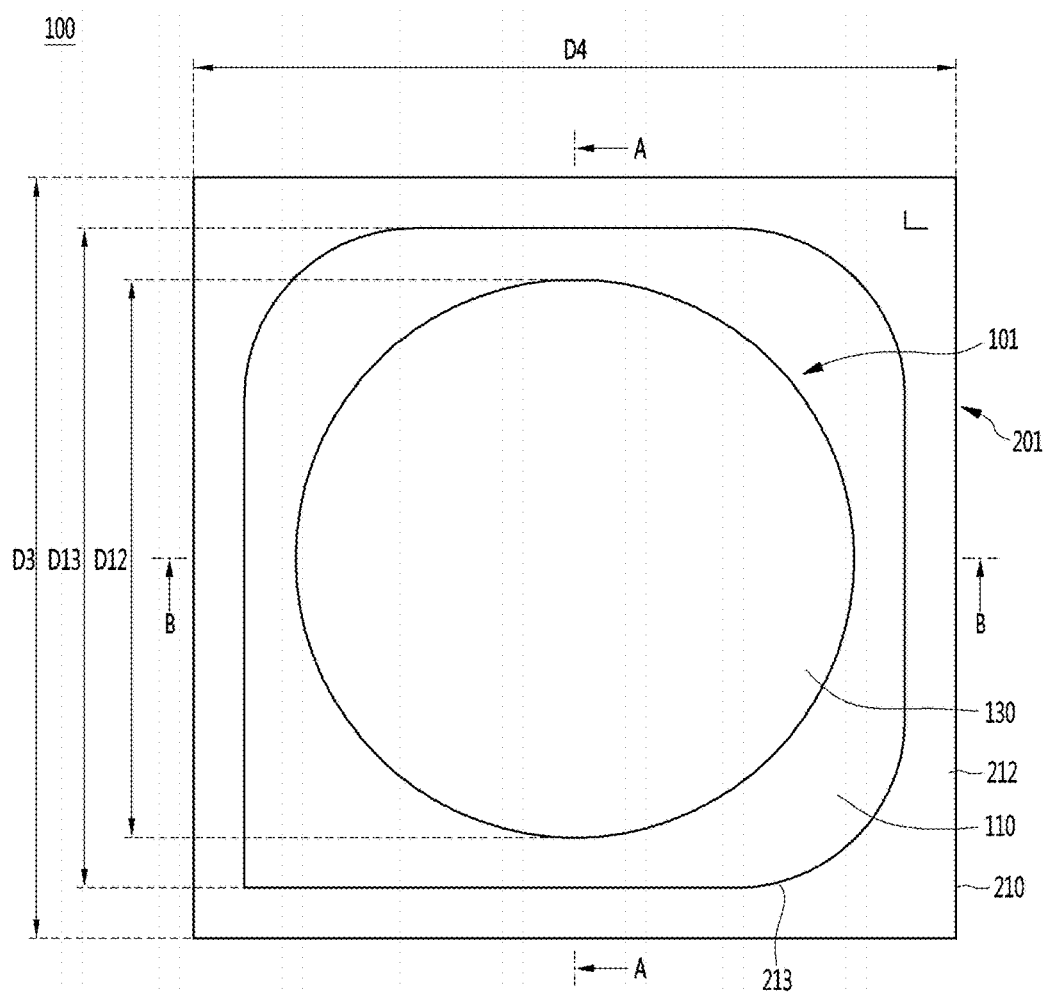
FIG. 3 is a plan view of the coupled light emitting module of FIG. 1.
Figure 4:
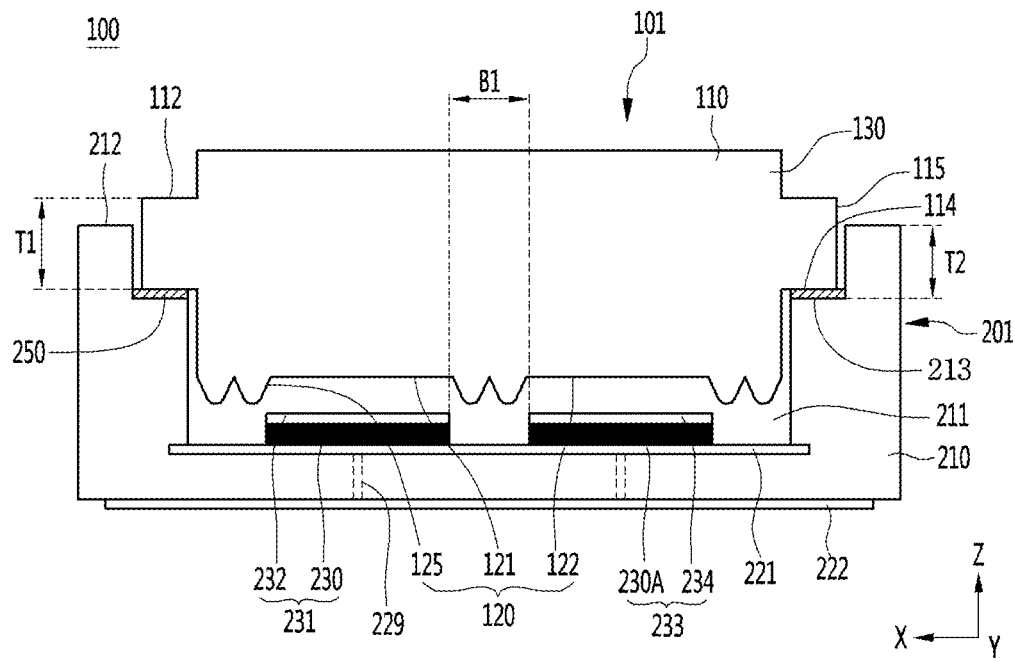
FIG. 4 is a cross-sectional view taken along line A-A of the light emitting module of FIG. 3.
Figure 5:
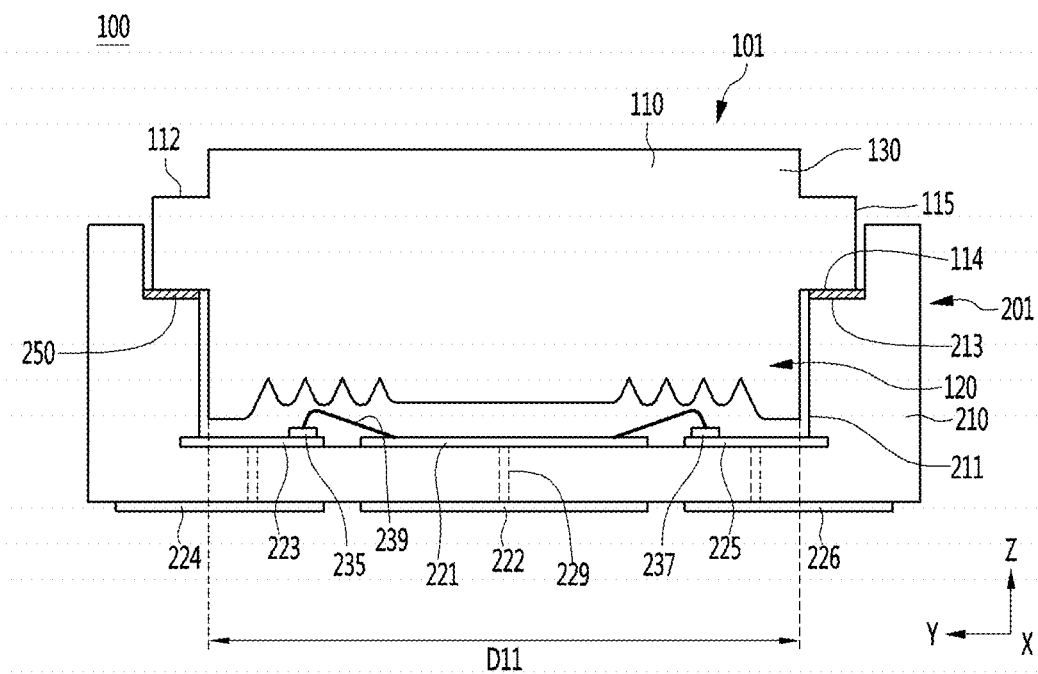
FIG. 5 is a cross-sectional view taken along line B-B of the light emitting module of FIG. 3.
Figure 6:
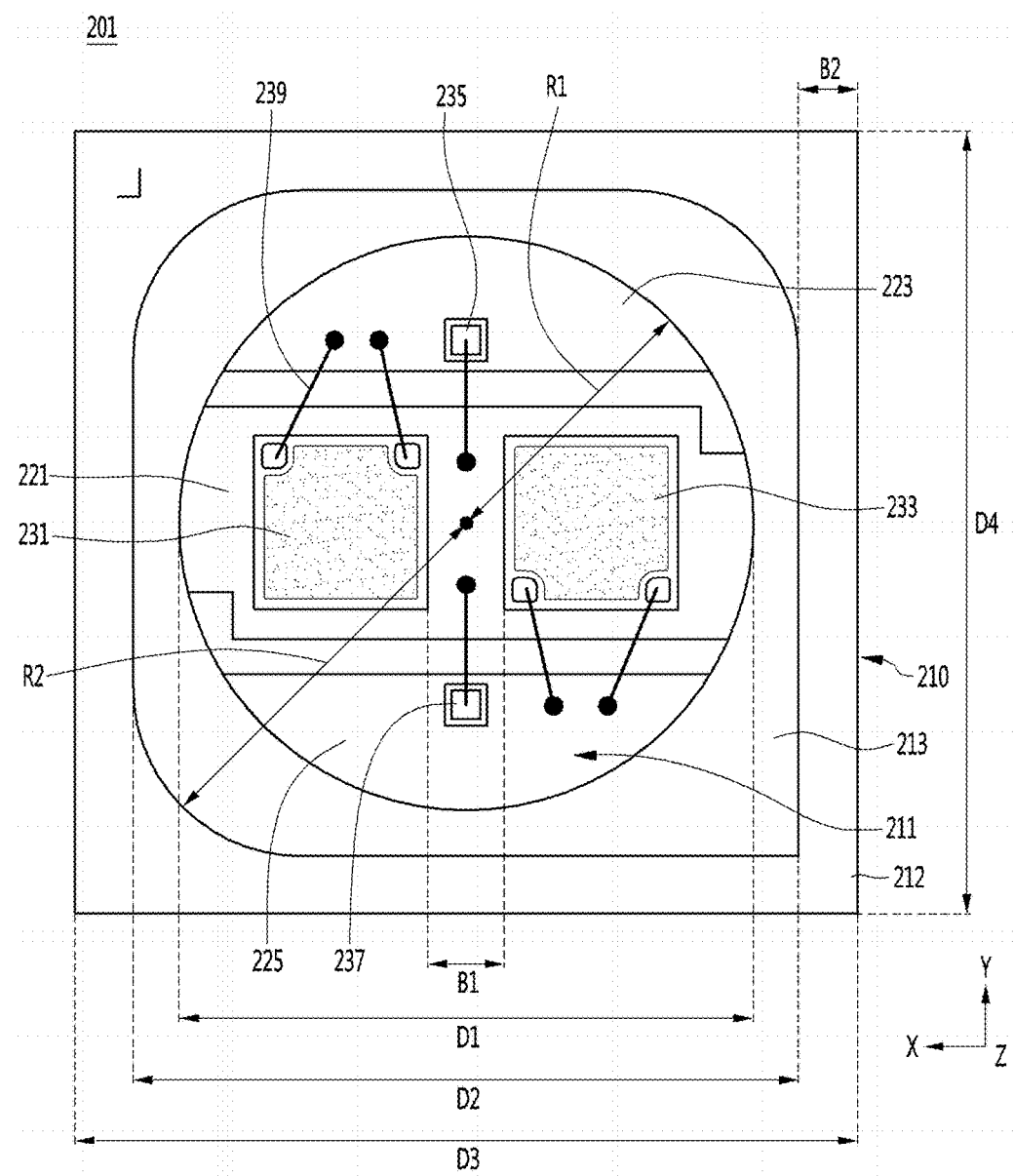
FIG. 6 is a plan view illustrating a detailed configuration of the light emitting device in the light emitting module of FIG. 1.
Figure 7:
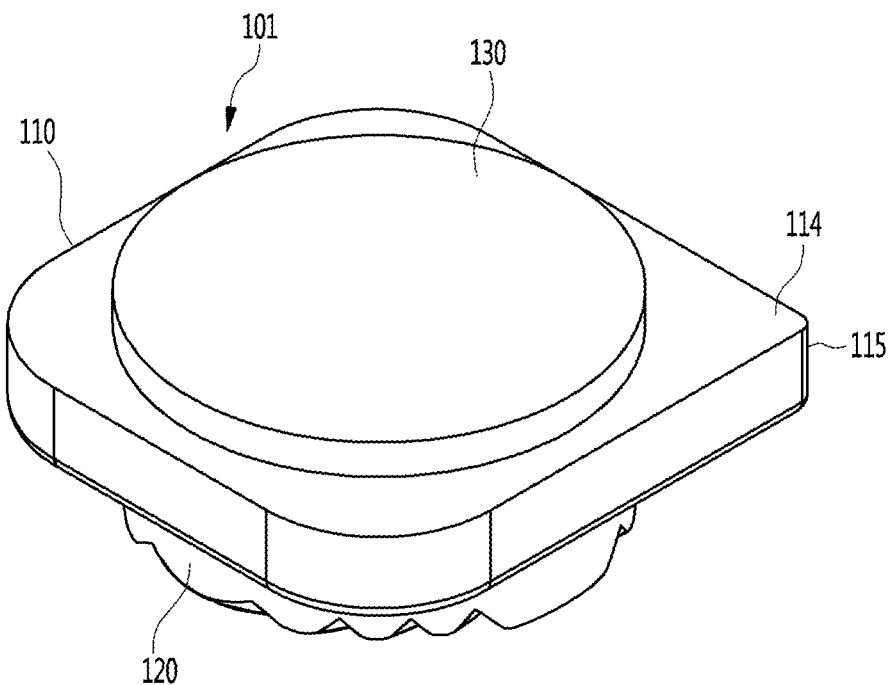
FIG. 7 is a perspective view illustrating the optical lens in the light emitting module of FIG. 1.

FIG. 1 is an exploded perspective view of a light emitting module according to an embodiment, FIG. 2 is a side cross-sectional view of an optical lens and a light emitting device of the light emitting module of FIG. 1, FIG. 3. is a view of the coupled light emitting module of FIG. 1, FIG. 4 is a cross-sectional view taken along line A-A of the light emitting module of FIG. 3, FIG. 5 is a cross-sectional view taken along line B-B of the light emitting module of FIG. 3, and FIG. 6 is a plan view illustrating a detailed configuration of the light emitting device in the light emitting module of FIG. 1.

Referring to FIGS. 1 to 6, a light emitting module 100 includes an optical lens 101 and a light emitting device 201 for providing light to the optical lens 101 under the optical lens 101.

The optical lens 101 includes a light-transmitting first body 110, an incident part 120 under the first body 110, and an emitting part 130 on the first body 110. The incident part 120 and the emitting part 130 may be integrally formed with the first body 110.

According to an embodiment, the optical lens 101 uses a plastic material such as an acrylic plastic material, for example, polymethyl methacrylate (PMMA). It is advantageous that the PMMA is superior in transparency to glass and easy to process and mold.

The optical lens 101 may function as a lens such as a light-extraction lens, or a light-diffusion lens. The optical lens 101 is a member for changing a directivity characteristic of light emitted from the light emitting device 201, and is not particularly limited thereto, but a transparent material having a refractive index of 1.4 or more and 1.7 or less may be used. The optical lens 101 may be formed of a transparent resin material such as polymethyl methacrylate (PMMA) having a refractive index of 1.49, a polycarbonate (PC) having a refractive index of 1.59, or a transparent resin material of an epoxy resin (EP) or a transparent glass.

The light emitting device 201 includes a second body 210 having a cavity 211 in which a lower portion of the optical lens 101 is disposed, a recess 213 having an upper surface (or recess surface) on a periphery of the cavity 211, a plurality of lead frames 221, 223, and 225, and light emitting diodes 231 and 233 disposed on at least one of the plurality of lead frames 221, 223, and 225. Here, as illustrated in FIGS. 2 and 4, the recess 213 may include a recess surface 213a (or upper surface) and a lateral surface 213b (or side surface) such that the recess surface 213a is positioned a prescribed distance below the upper surface 212 (or top surface) of the second body 201 by a distance T2.

Referring to FIGS. 1 and 8 to 10, the incident part 120 of the optical lens 101 protrudes from the first body 110 toward the light emitting device 201. Incident surfaces 121 and 122 may be formed on a lower surface of the incident part 120, and a pattern 125 may be formed on a periphery of the incident surfaces 121 and 122. The incident surfaces 121 and 122 may have a circular or elliptical shape having a predetermined size. The incident surfaces 121 and 122 may be flat surfaces, spherical surfaces or non-spherical surfaces, but are not limited thereto. The incident surfaces 121 and 122 may be disposed in plural, and the plurality of incident surfaces 121 and 122 may be spaced apart from each other. The incident surfaces 121 and 122 include a first incident surface 121 and a second incident surface 122.

The incident surfaces 121 and 122 of the incident part 120 may be disposed in the same number as the number of the light emitting diodes 231 and 233 disposed in the light emitting device 201. For example, when the number of the light emitting diodes 231 and 233 is plural, a plurality number of the incident surfaces 121 and 122 may be disposed to be spaced apart from each other. The incident surfaces 121 and 122 and the light emitting diodes 231 and 233 may be disposed in two or more.

The pattern 125 may have a concave-convex structure on the periphery of the incident surfaces 121 and 122. In the pattern 125, a convex pattern may be disposed in a concentric circle shape having different radii from centers of the incident surfaces 121 and 122 and condense incident light. A side cross-section of the convex pattern may include at least one of a hemispherical shape, a polygonal shape, and a protrusion shape having a curved surface. The pattern 125 disposed on the periphery of the first incident surface 121 may be disposed in a concentric circle shape having different radii from a center of the first incident surface 121. The pattern 125 disposed on the periphery of the second incident surface 122 may be disposed in a concentric circle shape having different radii from a center of the second incident surface 122. A center of the pattern 125 disposed on the periphery of the first incident surface 121 and a center of the pattern 125 disposed on the periphery of the second incident surface 122 may be different from each other.

A part of the pattern 125 may be disposed between the plurality of incident surfaces 121 and 122. The pattern 125 of the incident part 120 may condense light incident from different light emitting diodes 231 and 233 in an emitting direction.

Referring to FIGS. 3, 5, 6 and 8, the incident part 120 of the optical lens 101 has a first width D11 and may be disposed in the cavity 211 of the light emitting device 201. The incident part 120 is disposed lower than an upper surface 212 of the light emitting device 201 and may reduce loss of light emitted from the light emitting diodes 231 and 233. As shown in FIG. 6, an upper surface width B2 of the light emitting device 201 may be narrower than a region adjacent to an edge. The first width D11 of the incident part 120 may be equal to or narrower than a width D1 of the cavity 211 of the light emitting device 201 as shown in FIGS. 5 and 6. A bottom view shape of the incident part 120 may be a circular shape, and an outer shape of the incident part 120 may be a circular column shape. As another example, when the bottom view shape of the incident part 120 is a polygonal shape, the outer shape of the incident part 120 may be a polygonal columnar shape. A shape of a top view of the cavity 211 may be the same as that of the bottom view of the incident part 120. For example, the shape of the top view of the cavity 211 may be a circular shape. As another example, the shape of the top view of the cavity 211 may be an elliptical shape or a polygonal shape.

As shown in FIG. 3, the emitting part 130 protrudes from an upper surface of the first body 110 and has a surface through which light may be emitted. The emitting part 130 may be disposed with a second width D12 or a diameter, and the second width D12 or diameter may be equal to or wider than the first width D11 or diameter. Since the emitting part 130 has the width D12 equal to or greater than the first width D11 of the incident part 120, the light incident on the incident part 120 may be effectively emitted.

The second width D12 of the emitting part 130 may be equal to or different from the width D1 of the cavity 211 of the light emitting device 201. A top view shape or an upper surface of the emitting part 130 may have a circular shape, and an outer shape of the emitting part 130 may have a circular columnar shape. As another example, when the upper surface of the incident part 120 is a polygonal surface, the outer shape of the incident part 120 may be a polygonal columnar shape.

Figure 8:
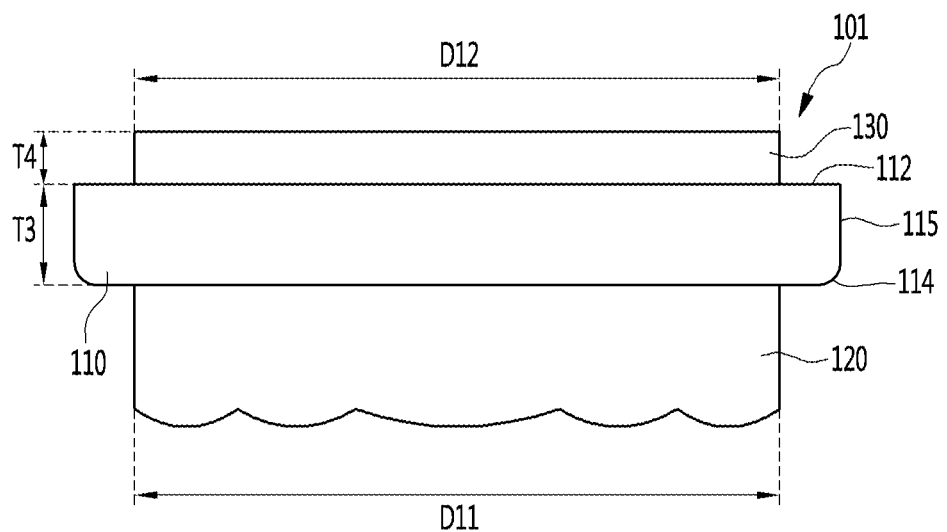
FIG. 8 is a side view of the optical lens of FIG. 7.
Figure 9:
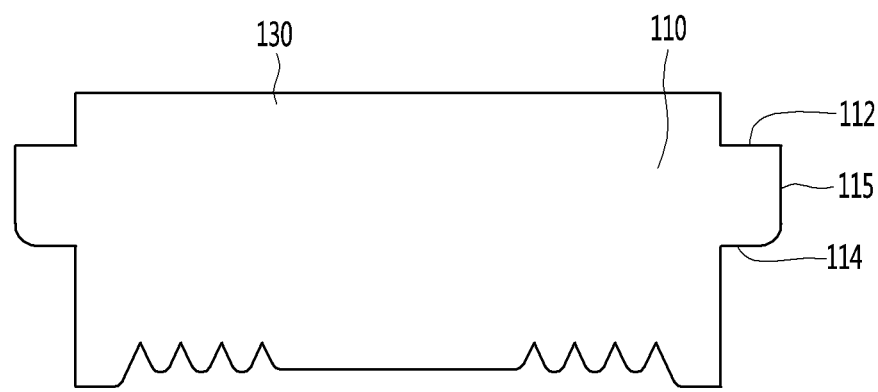
FIG. 9 is a side-sectional view of the optical lens of FIG. 7.
Figure 10:
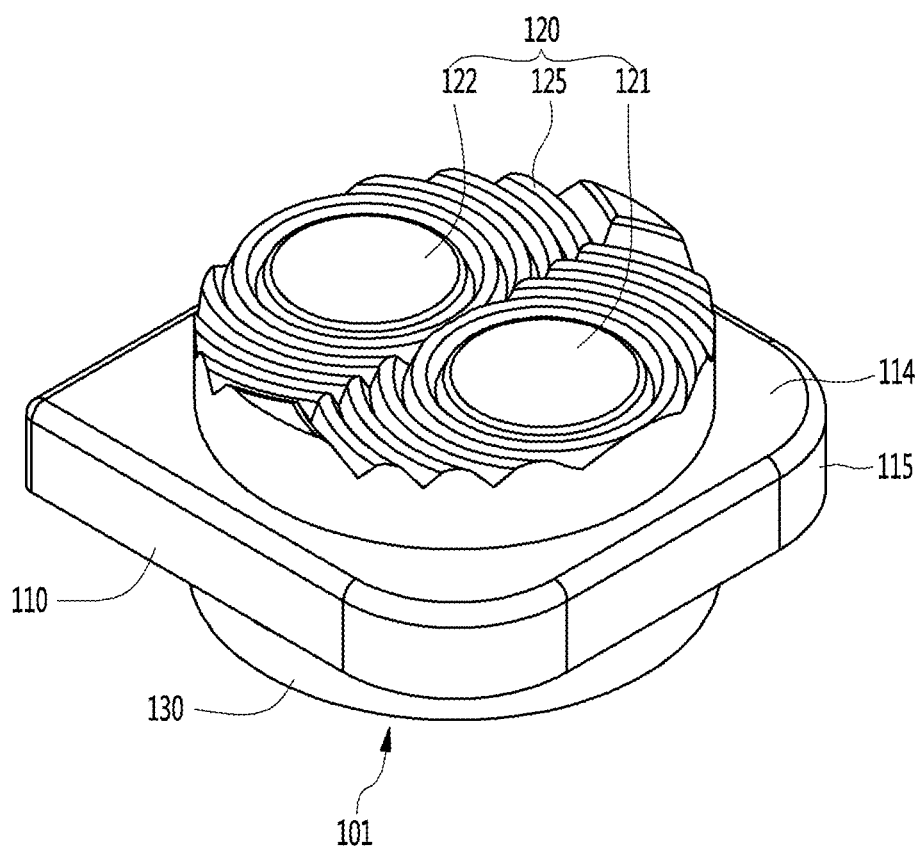
FIG. 10 is a rear view of the optical lens of FIG. 7.

As shown in FIG. 8, the optical lens 101 includes a protrusion portion 115, and the protrusion portion 115 may protrude to an outside of the first body 110. A width of the first body 110 may be a distance between opposite surfaces of the protrusion portion 115. The protrusion portion 115 is disposed lower than the upper surface of the emitting part 130 and higher than the lower surface of the incident part 120, and the protrusion portion 115 may protrude outward beyond outer peripheries of the emitting part 130 and the incident part 120. The protrusion portion 115 may be disposed closer to the emitting part 130 than the incident part 120.

The emitting part 130 of the optical lens 101 is disposed above an outer upper surface 112 of the protrusion portion 115 of the first body 110 and may be disposed in a stepped structure from the protrusion portion 115. The protrusion portion 115 may prevent the optical lens 101 from being detached through an opening 352 of a case 350, which is an object of application shown in FIG. 11.

The emitting part 130 protrudes from the outer upper surface 112 of the protrusion portion 115 with a predetermined thickness T4, and the thickness T4 may be in a range of 1 mm or less, for example, 0.5 mm to 0.9 mm. When the thickness T4 of the emitting part 130 is thinner than the above range, it is not possible to prevent foreign materials from entering through the opening 352 of the case 350 shown in FIG. 11. When the thickness T4 of the emitting part 130 is thicker than the above range, the emitting part 130 may protrude from the surface of the case 350, thereby deteriorating appearance of the case 350.

A partial region of the upper surface or the entire region of the upper surface of the emitting part 130 may be disposed vertically overlapped with the incident part 120. Accordingly, the light incident on the incident part 120 may be effectively emitted through the emitting part 130.

A partial area of the upper surface or the entire area of the upper surface of the emitting part 130 may be disposed to overlap with a region of the cavity 211 of the light emitting device 201 in a vertical direction as shown in FIGS. 4 and 5. Accordingly, light emitted through the cavity 211 may be emitted through the emitting part 130.

An outer lower surface 114 of the protrusion portion 115 of the first body 110 may be formed as a flat surface. An outer periphery of the protrusion portion 115 may be an outer periphery of the body 110. A plurality of corner regions of the protrusion portion 115 may be curved surfaces and any one of the corner regions may be an angled surface. A configuration in which any one of the corner regions of the first body 110 is shaped differently may indicate a position of polarity of an electrode and a coupling direction of the optical lens 101.

As shown in FIGS. 1 and 2, the optical lens 101 is disposed on a region of the light emitting device 201, and has a size that does not deviate outward beyond a side surface of the light emitting device 201. The optical lens 101 may be formed to have a size to be inserted into the light emitting device 201. A width of the optical lens 101 may be larger than the width D1 of the cavity 211 in FIG. 6 and may be equal to or less than a width D2 of the recess 213. The width of the optical lens 101 may be a width D13 of the first body 110. Here, an error range between the width D13 of the first body 110 and the width D2 of the recess 213 may have a range of difference, for example, from 0.001 μm to 10 μm, in which a lower portion of the first body 110 may be inserted on the recess 213. Here, as shown in FIG. 4, a thickness T1 of the first body 110 may be disposed greater than a depth T2 of the recess 213, which may facilitate disassembly or assembly of the optical lens 101.

A length D3 or D4 of the light emitting device 201 in a first direction or a second direction may be wider than the width of the optical lens 101 or the width D13 of the first body 110.

Meanwhile, the second body 210 of the light emitting device 201 may be formed of a reflective material with respect to wavelengths emitted by the light emitting diodes 231 and 233. The second body 210 includes an insulating material such as a ceramic material. The ceramic material includes a low temperature co-fired ceramic (LTCC) or a high temperature co-fired ceramic (HTCC) which are co-fired simultaneously. The material of the second body 210 may be AIN, and may be formed of a metal nitride having a thermal conductivity of 140 W/mK or more.

As another example, the second body 210 may be formed of a resin-based insulating material, for example, a resin material such as polyphthalamide (PPA), or a ceramic material. The second body 210 may be formed of a thermosetting resin including silicone, epoxy resin, or plastic material, or a material of high heat-resistance and high-light-resistance. The silicone includes a white-based resin.

A cavity 211 is formed in the second body 210, and the cavity 211 has a concave shape with an open top. The cavity 211 may be formed in a circular shape, an elliptical shape, or a polygonal shape when viewed from the device top side, and is not limited thereto. A side surface of the cavity 211 may be inclined at a predetermined angle or perpendicular to a bottom of the cavity 211 or upper surfaces of the lead frames 221, 223, and 225.

The recess 213 may be disposed along the periphery of the cavity 211 and may have a stepped structure from an upper surface 212 of the second body 210. An outer shape of the recess 213 has the same shape as an outer shape of the first body 110 of the optical lens 101. The lower portion of the first body 110 may be inserted into to the recess 213 and correspond to a lower surface 114 of the first body 110.

As shown in FIG. 6, when the cavity 211 is a circular shape, a radius R1 of the cavity 211 may be narrower than a radius R2 corresponding to the linear distance between the opposite curved surfaces of the recess 213.

An upper surface of the recess 213 may have the same area as the lower surface 114 of the first body 110 or may be disposed wider. The outer shape of the recess 213 is disposed differently from a shape of the cavity 211, for example, in a rectangular shape and edge regions of at least three of the corners of the rectangular shape are configured to process in a curved shape. An upper surface area of the recess 213 may be greater than in the case of the circular shape, and in addition, the first body 110 may be easily inserted.

The upper surface area of the recess 213 may be in a range of 30% to 50% of the entire upper surface area of the second body 210. When the upper surface area of the recess 213 is greater than the above range, a process and optical efficiency may be deteriorated. When the upper surface area of the recess 213 is smaller than the above range, the optical lens 101 may be separated and the reliability of the module may be deteriorated.

The cavity 211 of the light emitting device 201 includes a plurality of lead frames 221, 223, and 225 and light emitting diodes 231 and 233. The plurality of lead frames 221, 223, and 225 are disposed at the bottom of the cavity 211 and are spaced apart from each other. The plurality of lead frames 221, 223, and 225 are disposed in at least two, or three or more, and is not limited thereto.

The plurality of lead frames 221, 223 and 225 include a first lead frame 221 on a center side of the bottom of the cavity 211, and second lead frame 223 and third lead frame 225 disposed on opposite sides of the first lead frame 221. The first to third lead frames 221, 223, and 225 may be disposed parallel to each other. The first lead frame 221 may be disposed between the second lead frame 223 and third lead frame 225. The first, second, and third lead frames 221, 223, and 225 may be disposed in a first axis direction X in the cavity 211, and may be disposed in parallel with each other.

The first to third lead frames 221, 223, and 225 may be formed of a metal plate having a predetermined thickness, and another metal layer may be plated on a surface of the metal plate, and is not limited thereto.

The plurality of lead frames 221, 223 and 225 include at least one of metal materials such as titanium (Ti), copper (Cu), nickel (Ni), gold (Au), chromium (Cr), tantalum (Ta), platinum (Pt), tin (Sn), silver (Ag), and phosphorus (P), or an alloy of two substances. When the lead frames 221, 223, and 225 are formed of an alloy, the lead frames 221, 223, and 225 include an alloy of copper (Cu) and at least one kind of metal such as copper-zinc alloy, copper-iron alloy, copper-chromium alloy, and copper-silver-iron.

The light emitting diodes 231 and 233 may be disposed on the first lead frame 221 and may be electrically connected to the first lead frame 221. The light emitting diodes 231 and 233 are not connected to the first lead frame 221 by a separate wire but may be bonded with a conductive adhesive.

The light emitting diodes 231 and 233 are disposed in plural, and the plurality of light emitting diodes 231 and 233 may be disposed at least two or more, and is not limited thereto.

The plurality of light emitting diodes 231 and 233 include first and second light emitting diodes 231 and 233, the first light emitting diode 231 may be connected to the second lead frame 223 by a wire 239, and the second light emitting diode 233 may be connected to the third lead frame 225 by a wire 239. The wire 239 may be connected to each of the light emitting diodes 231 and 233 singularly or in plural, and is not limited thereto.

The first light emitting diode 231 and the second light emitting diode 233 may be driven separately and emit the same color, for example, white light. As another example, the first light emitting diode 231 and the second light emitting diode 233 may emit at least one of blue, green, red, and yellow light, and is not limited thereto.

The first light emitting diode 231 may be a warm white LED and the second light emitting diode 233 may include a cool white LED. The warm white LED and the cool white LED are devices emitting white light. The warm white LED and the cool white LED may emit white light of mixed light by radiating a correlated color temperature, and thus color rendering index (CRI) indicating close proximity to natural sunlight is increased. Accordingly, it is possible to prevent color of the actual object from being distorted, thereby reducing fatigue of a user's eyes.

The cool white LED may emit a correlated color temperature (CCT) within a range of 6,000K to 8,000K, thereby emitting white light without a combination of red, green, and blue LEDs. The warm white LED may emit a correlated color temperature (CCT) within a range of 2,000K to 4,000K, thereby emitting white light without a combination of red, green, and blue LEDs. The cool white LED and the warm white LED may emit corresponding color temperature in one cavity 211 and may emit mixed light into white light, and thus white light of high color rendering property can be emitted.

As shown in FIGS. 2 and 4, the first light emitting diode 231 may include a first light emitting chip 230 disposed on the first lead frame 221 and a first phosphor layer 232 disposed on the first light emitting chip 230, and may be implemented as a warm white LED. The first light emitting chip 230 may be connected to the first lead frame 221 by a conductive adhesive and may be connected to the second lead frame 223 by a wire 239. The first light emitting chip 230 may be a blue LED chip, and the first phosphor layer 232 may include a yellow phosphor. The first phosphor layer 232 may selectively include another phosphor such as a green phosphor or a red phosphor, in addition to a yellow phosphor.

The second light emitting diode 233 includes a second light emitting chip 230A disposed on the first lead frame 221 and a second phosphor layer 234 disposed on the second light emitting chip 230A, thereby being implemented as a cool white LED. The second light emitting chip 230A may be connected to the first lead frame 221 by a conductive adhesive and may be connected to the third lead frame 225 by a wire 239. The second light emitting chip 230A may be a blue LED chip, and the second phosphor layer 234 may include at least one or both of red and yellow phosphors. The second phosphor layer 234 may include another phosphor such as a green phosphor, in addition to the phosphor.

Any one or both of the first and second light emitting diodes 231 and 233 may be driven according to the operation, and the first and second light emitting diodes 231 and 233 may emit cool and/or warm white light by adjusting intensity of an input current.

As shown in FIGS. 1, 5, and 6, a first protection device 235 may be disposed on the second lead frame 223, and the first protection device 235 may be connected to the first lead frame 221 by a wire 239. A second protection device 237 may be disposed on the third lead frame 225, and the second protection device 237 may be connected to the first lead frame 221 by a wire 239. Accordingly, the first protection device 235 may be electrically connected to the first light emitting chip 230, and the second protection device 237 may be electrically connected to the second light emitting chip 230A. The first and second protection devices 235 and 237 may be implemented as a Thyristor, a Zener diode, or a Transient Voltage Suppression (TVS), and the Zener diode protects each of the first light emitting chip 230 and second light emitting chip 230A from electrostatic discharge (ESD).

Here, the wires 239 connected to the first and second protection devices 235 and 237 may be disposed in a region between the first and second light emitting chips 230 and 230A. The wires 239 connected to the first and second protection devices 235 and 237 may be disposed in a region between the first and second light emitting diodes 231 and 233. Here, a distance B1 between the first and second light emitting diodes 231 and 233 is greater than widths of the protection devices 235 and 237, and thus the wire 239 can be easily inserted, and thermal interference can be prevented.

As shown in FIGS. 4 and 5, first to third electrode pads 222, 224, and 226 are disposed under the second body 210, and the first to third electrode pads 222, 224, and 226 may be connected to the first to third lead frames 221, 223, and 225, respectively. The first to third electrode pads 222, 224, and 226 may be connected to each other by a via electrode 229 disposed in the second body 210, and is not limited thereto.

Figure 11:
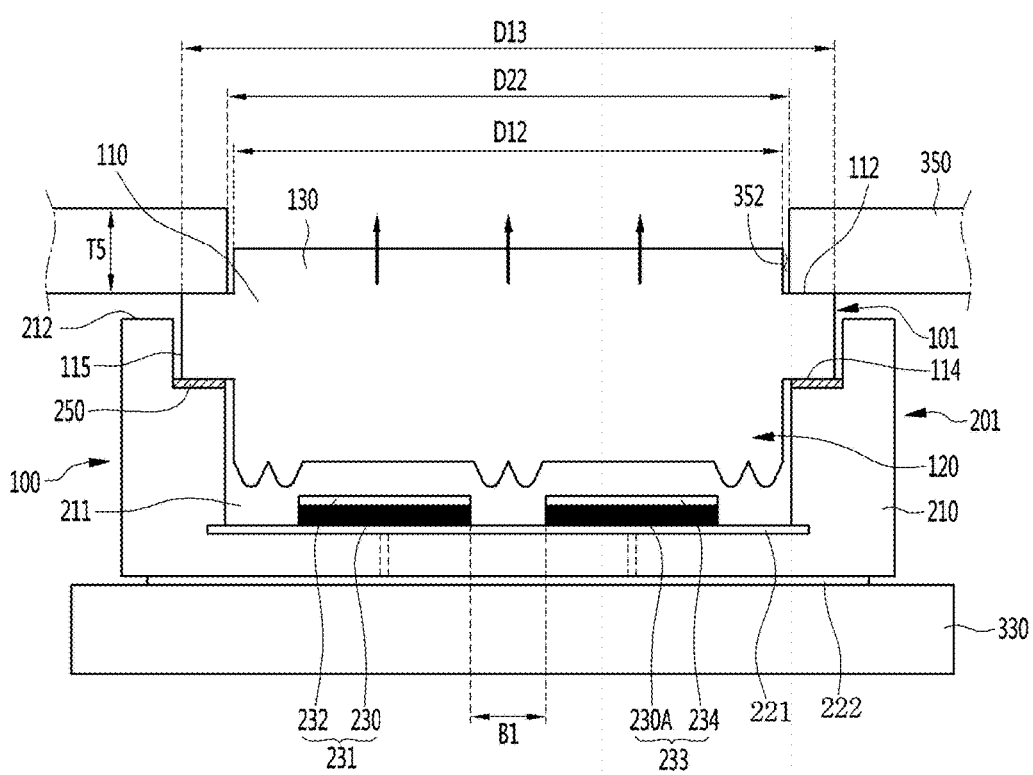
FIG. 11 is a view illustrating an example in which the light emitting module of FIG. 5 is coupled to a case.

As shown in FIGS. 5 and 11, the light emitting module 100 may be mounted on a circuit board 330. The first to third electrode pads 222, 224, and 226 may be disposed on the circuit board 330 and electrically connected to a circuit pattern of the circuit board 330. The circuit board 330 may include a resin PCB, a metal core PCB (MCPCB), and a flexible PCB (FPCB), and is not limited thereto.

Figure 16:
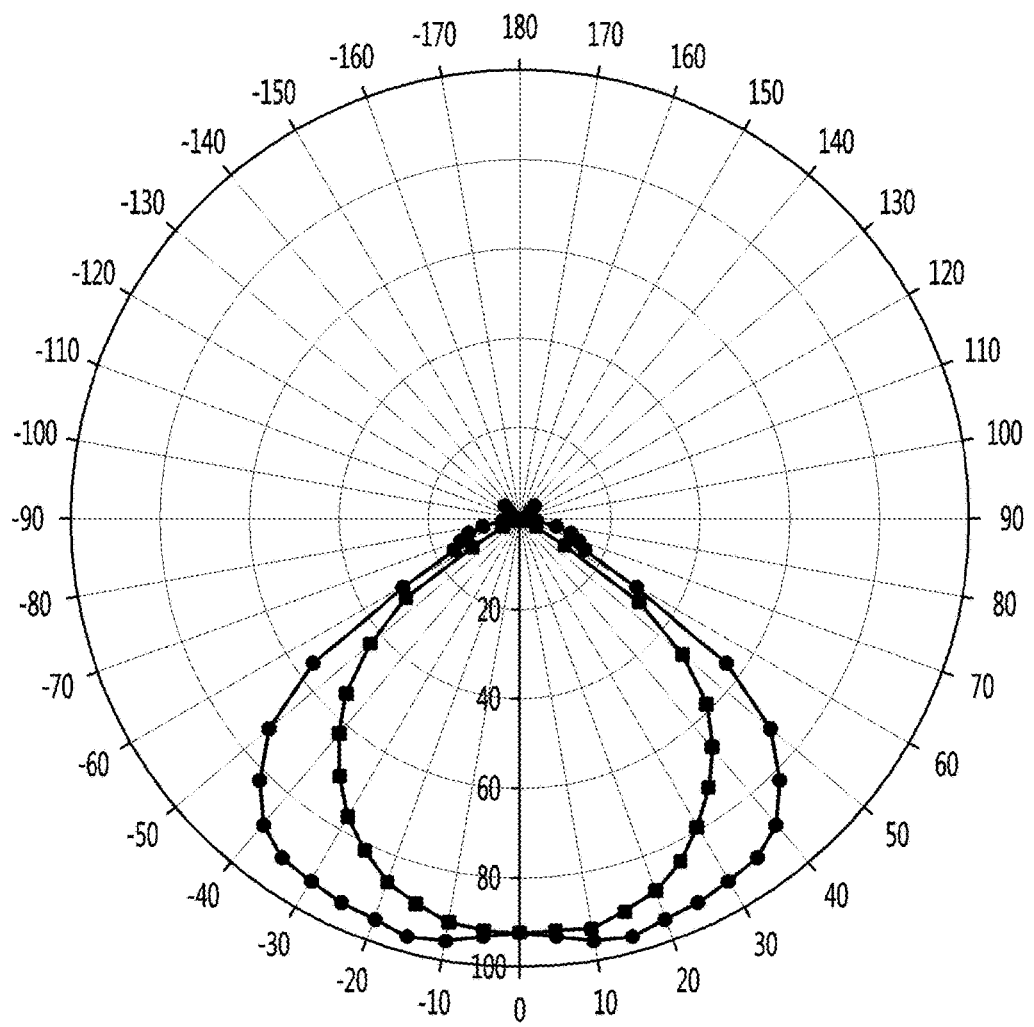
FIG. 16 is a view illustrating a directivity characteristic of a light emitting device according to an embodiment.
Figure 17:
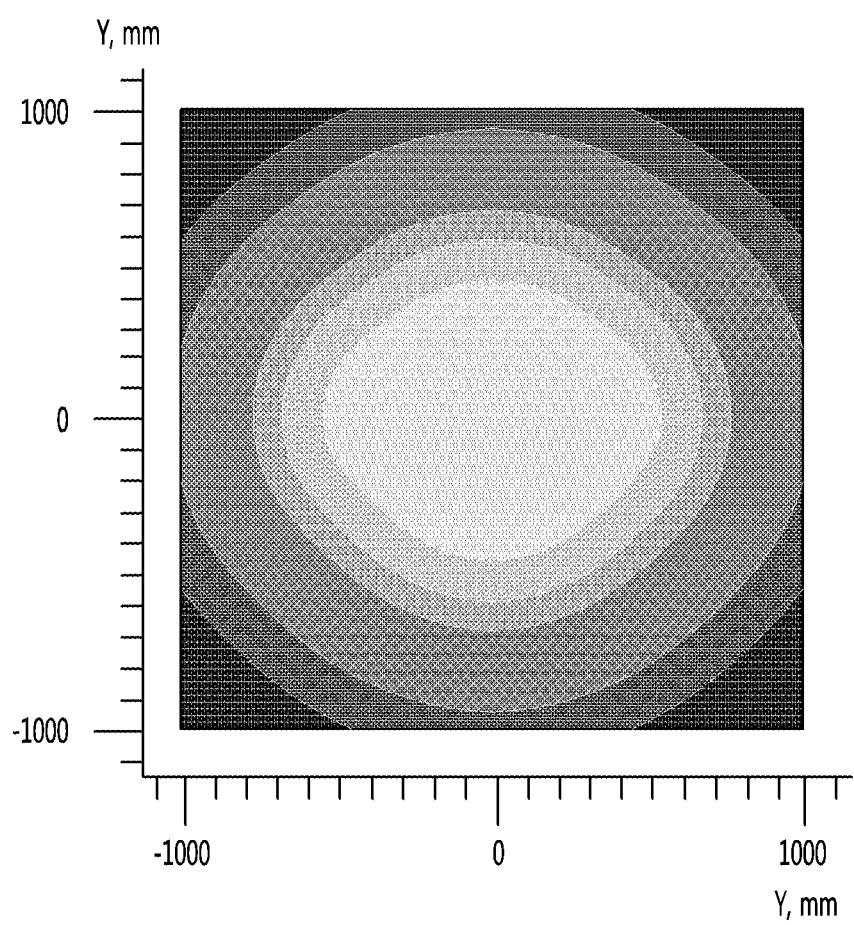
FIG. 17 is a view illustrating a light distribution of a light emitting module according to an embodiment.

When power is supplied to the light emitting device 201, the first and second light emitting diodes 231 and 233 are driven, and light emitted from the first and second light emitting diodes 231 and 233 is incident through the incident surfaces 121 and 122, and thus some of the light can be incident by the pattern 125 on the periphery of the incident surfaces 121 and 122. The emitting part 130 of the optical lens 101 emits the incident light. Here, FIG. 16 illustrates a directed angle distribution of a light emitting device according to an embodiment, and FIG. 17 is a diagram illustrating a light uniformity of a light emitting module 100 according to an embodiment.

A process of coupling the optical lens 101 according to the embodiment to the light emitting device 201 will be described. As shown in FIGS. 1 and 2, the optical lens 101 is positioned on the light emitting device 201, then, as shown in FIGS. 3 and 4, the incident part 120 of the optical lens 101 is inserted into the cavity 211, and the outer periphery of the first body 110 is disposed on the upper surface of the recess 213. The optical lens 101 may be coupled to the light emitting device 201 and thus the light emitting module 100 as shown in FIGS. 3 to 5 may be provided.

The incident part 120 of the optical lens 101 is disposed in the cavity 211. Each of the incident surfaces 121 and 122 of the incident part 120 may be disposed to face the first and second light emitting diodes 231 and 233, respectively.

Here, the outer lower surface 114 of the protrusion portion 115 of the first body 110 may be adhered to the upper surface of the recess 213, for example, an upper surface of a stepped structure with an adhesive 250. The adhesive 250 may include an adhesive material such as silicone or epoxy. The adhesive 250 may include a moisture-proof material for protecting the light emitting diodes 231 and 233, and is not limited thereto.

The upper surface area of the recess 213 and the outer lower surface 114 of the protrusion portion 115 of the first body 110 corresponding to the upper surface of the recess 213 provided to be sufficiently wide such that the optical lens 101 can be firmly adhered to the recess 213. In addition, the outer shape of the recess 213 is provided the same as the outer shape of the first body 110, and thus the outer lower surface 114 and an outer side surface of the first body 110 can be effectively adhered into the recess 213.

In the light emitting module 100, the optical lens 101 may be coupled into the light emitting device 201, and then may be mounted on the circuit board 330 as shown in FIG. 11, or the light emitting device 201 may be mounted on the circuit board 330 and then the optical lens 101 may be coupled into the light emitting device 201. The light emitting module 100 may be used as a flash module. The flash module may be applied to a mobile terminal such as a cellular phone or an indoor or outdoor lighting device.

Referring to FIG. 11, the light emitting module 100 may be disposed under the case 350. The opening 352 is disposed in the case 350, and the opening 352 may be formed in a region corresponding to the emitting part 130 of the optical lens 101. The emitting part 130 of the optical lens 101 is disposed in the opening 352 of the case 350. An outer shape of the opening 352 may have a shape corresponding to the emitting part 130.

A lower surface of the case 350 may be in contact with the upper surface 112 of the first body 110 of the optical lens 101. A width D22 of the opening 352 of the case 350 may be narrower than the width D13 of the first body 110 of the optical lens 101 and may be wider than the width D12 of the emitting part 130.

The width D12 or the diameter of the emitting part 130 of the optical lens 101 may be the same as the width D22 or the diameter of the opening 352 of the case 350. Here, an error range between the width D12 of the emitting part 130 and the opening 352 of the case 350 may be an error range, for example, 0.001 μm to 10 μm, in which the emitting part 130 may be inserted into the opening 352 of the case 350.

Referring to FIGS. 8 and 11, the thickness T4 of the emitting part 130 of the optical lens 101 may be thinner than a thickness T5 of the case 350. Accordingly, the upper surface of the emitting part 130 does not protrude above an upper surface of the case 350. The upper surface of the emitting part 130 is disposed lower than the upper surface of the case 350 and higher than the upper surface of the first body 110, and thus foreign materials can be prevented from entering through the opening 352. In addition, it is possible to eliminate a necessity of attaching a lens disposed on a separate opening on the optical lens 101.

A difference in gap between the upper surface of the case 350 and an upper surface of the optical lens 101 is small when viewed from an outside of the case 350, and thus the upper surface of the optical lens 101 may be exposed to an outside of the case 350 without protruding. In addition, the upper surface of the optical lens 101 is not excessively recessed from the upper surface of the case 350, and thus appearance of the case 350 can be improved.

FIGS. 12 to 15 are views illustrating a modification of an optical lens 101 in a light emitting module 100 according to an embodiment.

Figure 12:
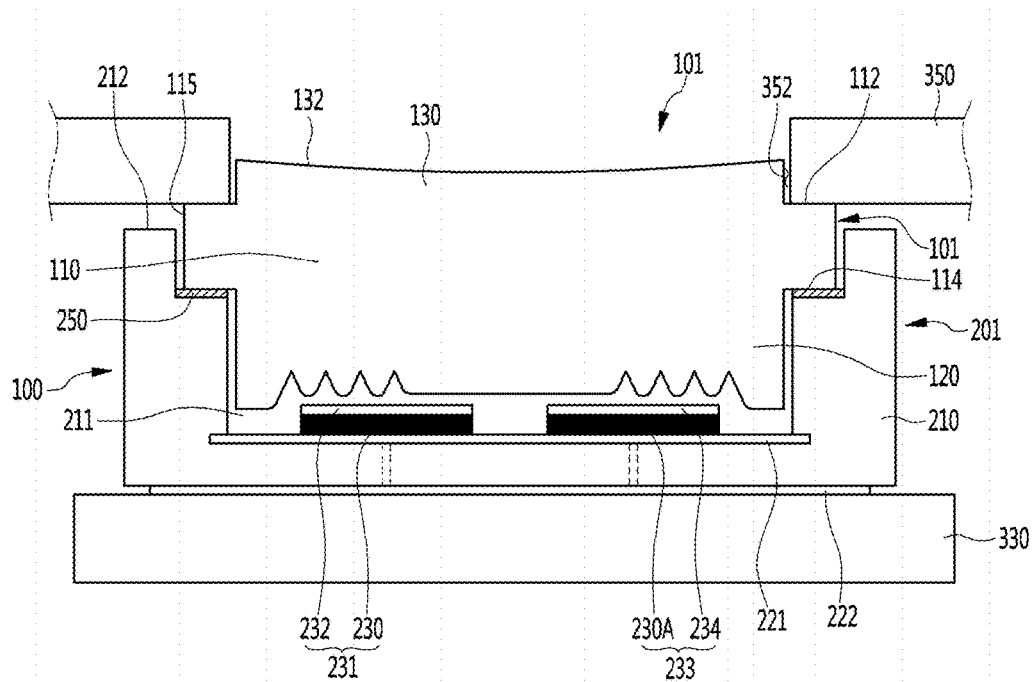
FIG. 12 is a view illustrating a first modification of the optical lens in the light emitting module of FIG. 11.

Referring to FIG. 12, the optical lens 101 of the light emitting module 100 includes a curved surface 132 having a concave upper surface of the emitting part 130. The concave curved surface may be formed at a depth of him or less, which is problematic in that foreign materials exist when the concave curved surface is deeper than the depth. A lighting path may be adjusted by the concave curved surface 132.

Figure 13:
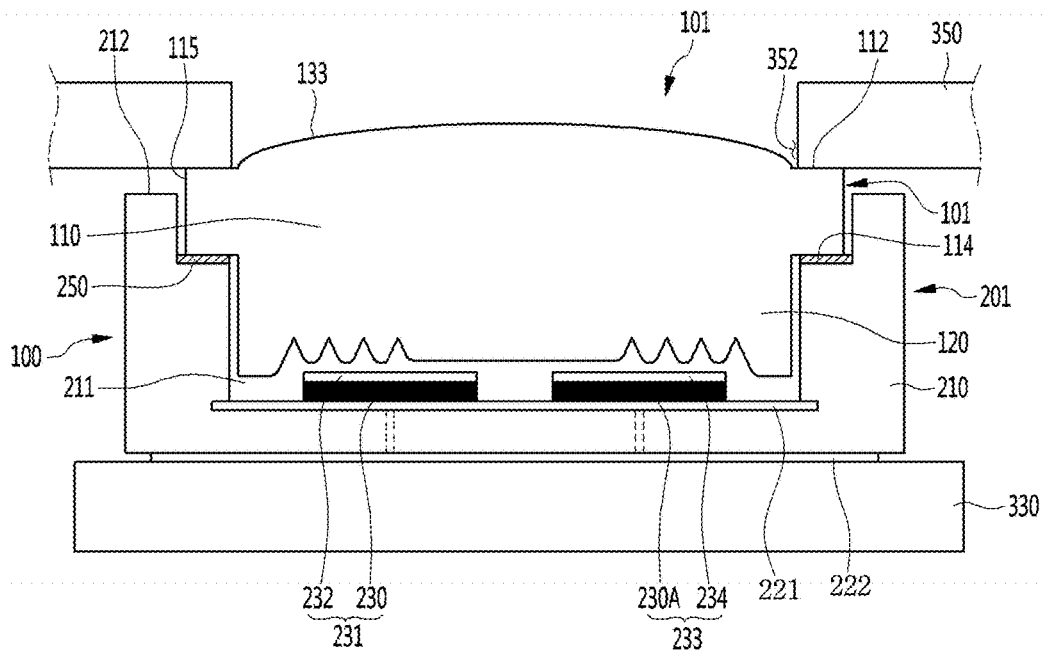
FIG. 13 is a view illustrating a second modification of the optical lens in the light emitting module of FIG. 11.

Referring to FIG. 13, the optical lens 101 of the light emitting module 100 includes a convex curved surface 133 of the entire upper surface of the emitting part 130. A top of the convex curved surface 133 may be disposed lower than the upper surface of the case 350. The convex curved surface 133 may prevent foreign materials from accumulating on a light emitting surface. The lighting path may be controlled according to the convex curved surface 133 of the optical lens 101.

Figure 14:
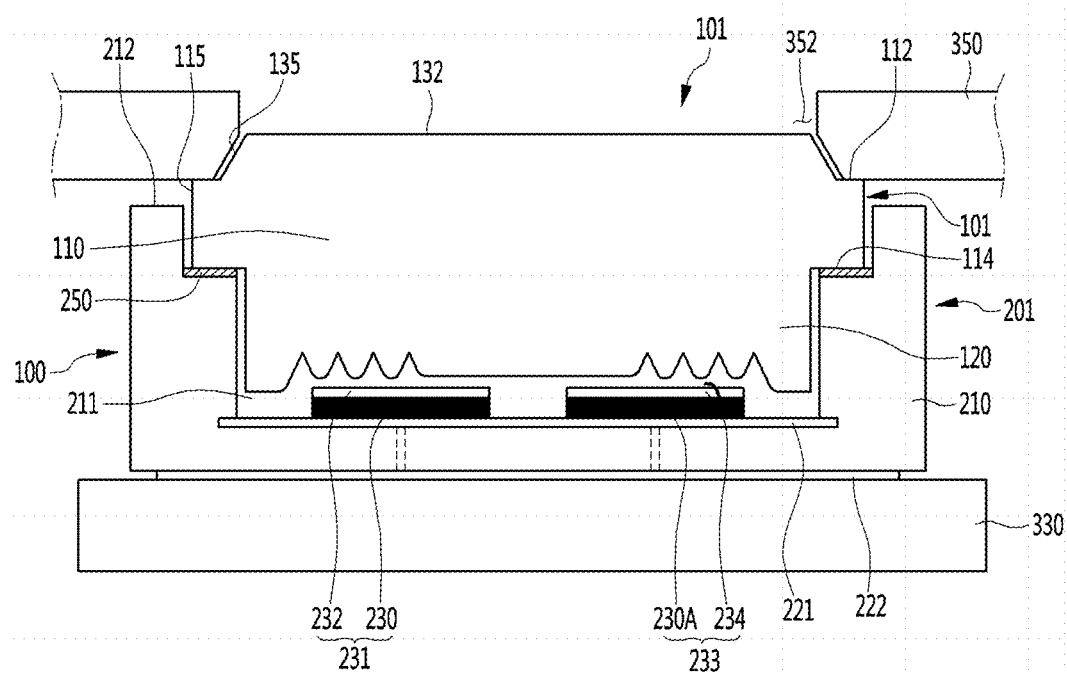
FIG. 14 is a view illustrating a third modification of the optical lens in the light emitting module of FIG. 11.

Referring to FIG. 14, in the optical lens 101 of the light emitting module 100, the upper surface of the emitting part 130 may be a spherical or non-spherical surface, and an outer surface 135 of the emitting part 130 may extend from the upper surface 112 of the protrusion portion 115 of the first body 110 to a curved surface or an inclined surface. The curved surface or the inclined surface may have a larger area corresponding to a periphery of the case 350, thereby preventing foreign materials from entering from the outside.

Figure 15:
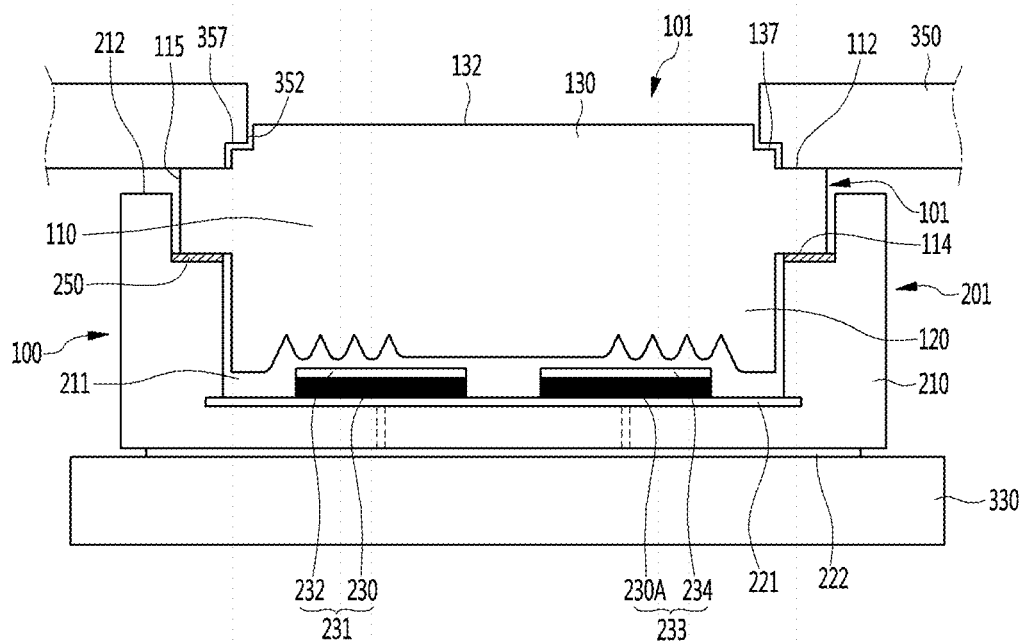
FIG. 15 is a view illustrating a fourth modification of the optical lens in the light emitting module of FIG. 11.

Referring to FIG. 15, the optical lens 101 of the light emitting module 100 may be configured such that an upper surface 132 of the emitting part 130 may be flat, spherical or non-spherical, and an outer region of the emitting part 130 may extend from the upper surface 112 of the protrusion portion 115 of the first body 110 to a stepped structure 137. A stepped region 357 of the case 350 may correspond to the stepped structure 137. Accordingly, it is possible to prevent foreign substances from entering into an outer periphery of the optical lens 101 through the opening 352 of the case 350.

Figure 18:
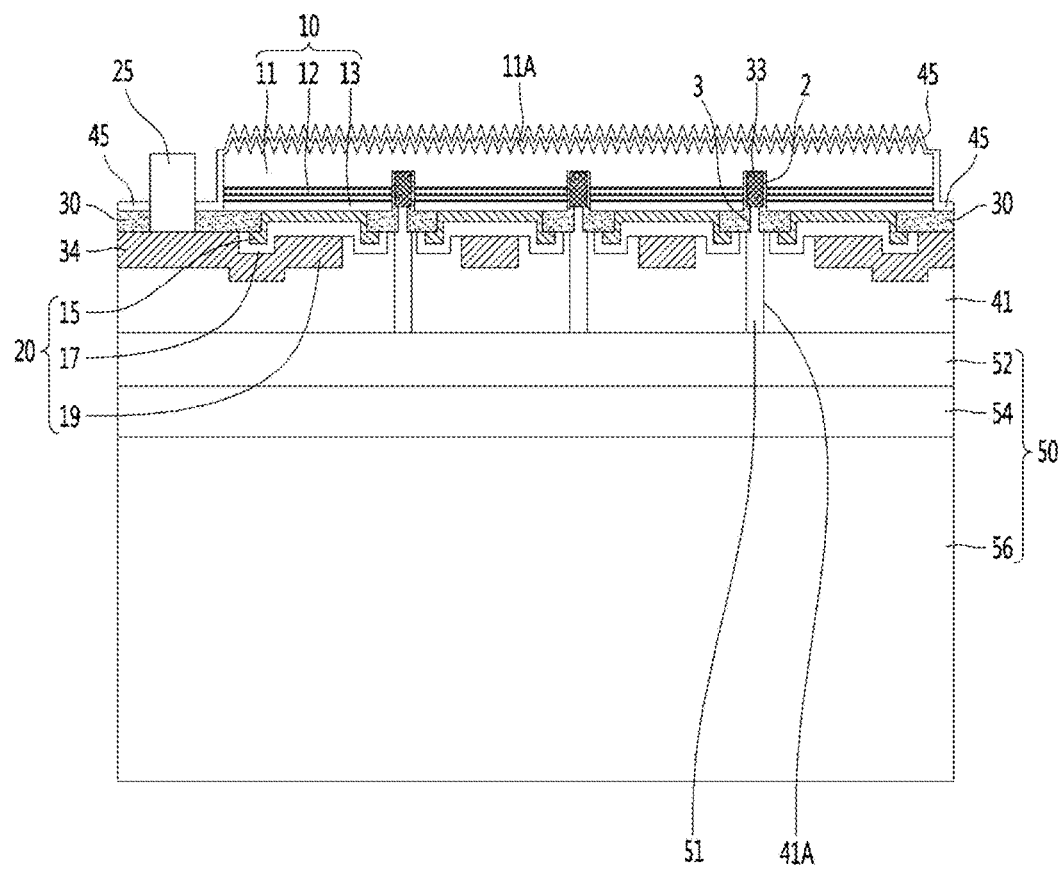
FIG. 18 is a view illustrating a light emitting chip of a light emitting device according to an embodiment.

FIG. 18 is a view illustrating another example of a light-emitting chip according to an embodiment.

Referring to FIG. 18, the light-emitting chip may include a light-emitting structure 10 including a plurality of semiconductor layers 11, 12, 13, a first electrode layer 20 under the light-emitting structure 10, a second electrode layer 50 under the first electrode layer 20, an insulation layer 41 between the first and second electrode layers 20 and 50, and a pad 25.

The light-emitting structure 10 may include a first semiconductor layer 11, an active layer 12, and a second semiconductor layer 13. The active layer 12 may be disposed between the first semiconductor layer 11 and the second semiconductor layer 13. The active layer 12 may be disposed under the first semiconductor layer 11, and the second semiconductor layer 13 may be disposed under the active layer 12.

For example, the first semiconductor layer 11 may include an n-type semiconductor layer to which a first conductive type dopant, e.g., an n-type dopant is added, and the second semiconductor layer 13 may include a p-type semiconductor layer to which a second conductive type dopant, e.g., a p-type dopant is added. On the other hand, the first semiconductor layer 11 may be provided as a p-type semiconductor layer, and the second semiconductor layer 13 may be provided as an n-type semiconductor layer.

The first semiconductor layer 11 may be, for example, an n-type semiconductor layer. The first semiconductor layer 11 includes a composition formula of $In_xAl_yGa_{1-x-y}N$ ($0 \le x \le 1$, $0 \le y \le 1$, $0 \le x+y \le 1$). The first semiconductor layer 11 may be a compound semiconductor of a group III-V element such as GaN, AlN, AlGaN, InGaN, InN, InAlGaN, AlInN, AlGaAs, GaP, GaAs, GaAsP and AlGaInP. The first conductive dopant is an n-type dopant and includes dopants such as Si, Ge, Sn, Se, and Te.

The active layer 12 is disposed under the first semiconductor layer 11 and selectively includes a single quantum well, a multiple quantum well (MQW), a quantum wire structure, or a quantum dot structure, and includes the period of the well layer and the barrier layer. The period of the well layer and the barrier layer includes, for example, at least one of pairs of InGaN/AlGaN, InGaN/AlGaN, InGaN/InGaN, AlGaAs/GaA, InGaAs/GaAs, InGaP/GaP, AlInGaP/InGaP, InGaN/AlGaN, InGaN/AlGaN.

The second semiconductor layer 13 is disposed under the active layer 12. The second semiconductor layer 13 may include a semiconductor doped with a second conductive dopant, for example, a composition formula of $In_xAl_yGa_{1-x-y}N$ ($0 \le x \le 1$, $0 \le y \le 1$, $0 \le x+y \le 1$). The second semiconductor layer 13 may include at least one of compound semiconductors such as GaN, InN, AlN, InGaN, AlGaN, InAlGaN, AlInN, AlGaAs, GaP, GaAs, GaAsP and AlGaInP. The second semiconductor layer 13 may be a p-type semiconductor layer, and the first conductivity type dopant may include Mg, Zn, Ca, Sr, and Ba as p-type dopants.

A rough unevenness 11A may be disposed on a top surface of the first semiconductor layer 11, and the unevenness surface 11A may improve light extraction efficiency. The unevenness surface 11A may have a lateral cross-section with a polygonal shape or a hemispherical shape.

The first electrode layer 20 is disposed between the light-emitting structure and the second electrode layer 50 and electrically connected to the second semiconductor layer 13 of the light-emitting structure 10 and also electrically connected to the second electrode layer 50. The first electrode layer 20 includes a first contact layer 15, a reflective layer 17, and a capping layer 19. The first contact layer 15 is disposed between the reflective layer 17 and the second semiconductor layer 13, and the reflective layer 17 is disposed between the first contact layer 15 and the capping layer 19. The first contact layer 15, the reflective layer 17, and the capping layer 19 may be made of different conductive materials, but is not limited thereto.

The first contact layer 15 may come into contact with the second semiconductor layer, for example, come into ohmic-contact with the second semiconductor layer 13. The first contact layer 15 may be made of, for example, a conductive oxide film, conductive nitride, or a metal. The first contact layer 15 may be made of at least one of indium tin oxide (ITO), ITO nitride (ITON), indium zinc oxide (IZO), IZO nitride (IZON), aluminum zinc oxide (AZO), aluminum gallium zinc oxide (AGZO), indium zinc tin oxide (IZTO), indium aluminum zinc oxide (IAZO), indium gallium zinc oxide (IGZO), indium gallium tin oxide (IGTO), antimony tin oxide (ATO), gallium zinc oxide (GZO), IZO nitride (IZON), ZnO, IrOx, RuOx, NiO, Pt, Ag, and Ti.

The reflective layer 17 may be electrically connected to the first contact layer 15 and the capping layer 19. The reflective layer 17 may reflect light incident from the light-emitting structure 10 to perform a function for increasing an amount of light extracted to the outside.

The reflective layer 17 may be made of a metal having light reflectivity of 70% or more. For example, the reflective layer 17 may be made of a metal including at least one of Ag, Ni, Al, Rh, Pd, Ir, Ru, Mg, Zn, Pt, Au and Hf or an ally thereof. Also, the reflective layer 17 may be realized as a multi-layer using the above-described metal or an alloy and a light transmissive conductive material such as indium-tin-oxide (ITO), indium-zinc-oxide (IZO), indium-zinc-tin-oxide (IZTO), indium-aluminum-zinc-oxide (IAZO), indium-gallium-zinc-oxide (IGZO), indium-gallium-tin-oxide (IGTO), aluminum-zinc-oxide (AZO), or antimony-tin-oxide (ATO). For example, the reflective layer 17 according to an embodiment may include at least one of Ag, Al, an Ag—Pd—Cu alloy, or an Ag—Cu alloy. For example, the reflective layer 17 may have a structure in which an Ag layer and a Ni layer are alternately disposed or may include a Ni/Ag/Ni or Ti layer and a Pt layer. For another example, the first contact layer 15 may be disposed under the reflective layer 17, and at least a portion of the first contact layer 15 may pass through the reflective layer 17 to come into contact with the second semiconductor layer 13. For another example, the reflective layer 17 may be disposed under the first contact layer 15, and a portion of the reflective layer 17 may pass through the first contact layer 15 to come into contact with the second semiconductor layer 13.

The light-emitting device according to an embodiment may include a capping layer 19 disposed under the reflective layer 17. The capping layer 19 comes into contact with a bottom surface of the reflective layer 17, and a contact part 34 is coupled to a pad 25 to function as a line layer for transmitting power supplied to the pad 25. The capping layer may be made of a metal, for example, at least one of Au, Cu, Ni, Ti, Ti—W, Cr, W, Pt, V, Fe, and Mo.

The contact part 34 of the capping layer 19 is disposed in a region, which does not vertically overlap the light-emitting structure 10, to vertically overlap the pad 25. The contact part 34 of the capping layer 19 is disposed in a region which does not vertically overlap the first contact layer 15 and the reflective layer 17. The contact part 34 of the capping layer 19 is disposed at a position lower than that of the light-emitting structure 10 to come into direct contact with the pad 25.

The pad 25 may be provided as a single layer or multi-layered structure. The single layer may be made of Au, and when the pad 25 is provided as the multilayered structure, the pad 25 may include at least two materials of Ti, Ag, Cu, and Au. Here, in case of the multilayered structure, a laminated structure of Ti/Ag/Cu/Au or a laminated structure of Ti/Cu/Au may be provided. At least one of the reflective layer 17 and the first contact layer 15 may come into direct contact with the pad 25, but is not limited thereto.

The pad 25 may be disposed in a region between an outer wall of the first electrode layer 20 and the light-emitting structure 10. The protective layer 30 and the light transmissive layer 45 may come into contact with a periphery of the pad 25.

The protective layer 30 may be disposed on a bottom surface of the light-emitting structure 10 to come into contact with a bottom surface of the second semiconductor layer 13 and the first contact layer 15 and also come into contact with the reflective layer 17.

An inner portion, which vertically overlaps the light-emitting structure 10, of the protective layer 30 may be disposed to vertically overlap a region of a protrusion 51. An outer portion of the protective layer 30 may extend upward from the contact part 34 of the capping layer 19 and be disposed to vertically overlap the contact part 34. The outer portion of the protective layer 30 may come into contact with the pad 25, for example, be disposed on a circumferential surface of the pad 25.

The inner portion of the protective layer 30 may be disposed between the light-emitting structure 10 and the first electrode layer 20, and the outer portion may be disposed between the light transmissive layer 45 and the contact part 34 of the capping layer 45. The outer portion of the protective layer 30 may extend from a side wall of the light-emitting structure 10 to an external region A1 to prevent moisture from being permeated.

The protective layer 30 may be defined as a channel layer, a low refractive index material layer, or an isolation layer. The protective layer 30 may be made of an insulation material, e.g., oxide or nitride. For example, the protective layer 30 may be made of at least one material selected from the group consisting of $SiO_2$, $Si_xO_y$, $Si_3N_4$, $Si_xN_y$, $SiO_xN_y$, $Al_2O_3$, $TiO_2$, and AlN. The protective layer 30 may be made of a transparent material.

The light-emitting device according to an embodiment may include an insulation layer for electrically insulating the first electrode layer 20 from the second electrode layer 50. The insulation layer 41 may be disposed between the first electrode layer 20 and the second electrode layer 50. An upper portion of the insulation layer 41 may come into contact with the protective layer 30. The insulation layer 41 may be made of, for example oxide or nitride. For example, the insulation layer 41 may be made of at least one material selected from the group consisting of $SiO_2$, $Si_xO_y$, $Si_3N_4$, $Si_xN_y$, $SiO_xN_y$, $Al_2O_3$, $TiO_2$, and A1N.

The insulation layer 41 may have, for example, a thickness of 100 nanometers to 2,000 nanometers. When the insulation layer 41 has a thickness of 100 nanometers or less, insulation characteristics may be deteriorated. When the insulation layer 41 has a thickness exceeding 2,000 nanometers, cracking may occur in the post-process. The insulation layer 41 may come into contact with a bottom surface of the first electrode layer 20 and a top surface of the second electrode layer 50 and thus have a thickness greater than that of each of the protective layer 30, the capping layer 19, the contact layer 15, and the reflective layer 17.

The second electrode layer 50 may include a diffusion barrier layer 52 disposed under the insulation layer 41, a bonding layer 54 disposed under the diffusion barrier layer 52, and a conductive support member 56 disposed under the bonding layer 54 and be electrically connected to the first semiconductor layer 11. Also, the second electrode layer 50 may selectively include one or two of the diffusion barrier layer 52, the bonding layer 54, and the conductive support member 56. At least one of the diffusion barrier layer 52 and the bonding layer 54 may be omitted.

The diffusion barrier layer 52 may be made of at least one of Au, Cu, Ni, Ti, Ti—W, Cr, W, Pt, V, Fe, and Mo. The diffusion barrier layer 52 may function as a diffusion barrier between the insulation layer 41 and the bonding layer 54. The diffusion barrier layer 52 may be electrically connected to the bonding layer 54 and the conductive support member 56 and also electrically connected to the first semiconductor layer 11.

The diffusion barrier layer 52 may perform a function for preventing a material contained in the bonding layer 54 from being diffused in a direction of the reflective layer 17 when the bonding layer 54 is manufactured. The diffusion barrier layer 52 may prevent a material such as tin (Sn) contained in the bonding layer 54 from having an influence on the reflective layer 17.

The bonding layer 54 may be made of a barrier metal or bonding metal, for example, at least one of Ti, Au, Sn, Ni, Cr, Ga, In, Bi, Cu, Ag, Nb, Pd, or Ta. The conductive support member 56 may perform a heat dissipation function by supporting the light-emitting structure 10 according to an embodiment. The bonding layer 54 may include a seed layer.

The conductive support member 56 may be formed by using a metal or a carrier substrate, for example, a semiconductor substrate (e.g., Si, Ge, GaN, GaAs, ZnO, SiC, and SiGe) into which Ti, Cr, Ni, Al, Pt, Au, W, Cu, Mo, Cu—W or an impurity is injected. The conductive support member 56 may be a layer for supporting the light-emitting device 100 and have a thickness corresponding to 80% of a thickness of the second electrode layer 50, i.e., a thickness of 30 µm or more.

Meanwhile, the second contact layer 33 is disposed in the first semiconductor layer 11 to come into contact with the first semiconductor layer 11. A top surface of the second contact layer may be disposed at a position higher than a bottom surface of the first semiconductor layer 11, electrically connected to the first semiconductor layer 11, and insulated from the active layer 12 and the second semiconductor layer 13.

The second contact layer 33 may be electrically connected to the second electrode layer 50. The second contact layer 33 may be disposed to pass through the first electrode layer 20, the active layer 12, and the second semiconductor layer 15. The second contact layer 33 may be disposed in a recess 2 defined in the light-emitting structure 10 and a hole 3 and insulated from the active layer 12 and the second semiconductor layer 15 by the protective layer 30. The second contact layer 33 may be provided in plurality, and the plurality of second contact layers 33 may be spaced apart from each other.

The second contact layer 33 may be connected to a protrusion 51 of the second electrode layer 50, and the protrusion 51 may protrude from the diffusion barrier layer 52. The protrusion 51 may pass through a hole 41A defined in the insulation layer 41 and the protrusion layer 30 and be insulated from the first electrode layer 20.

The second contact layer 33 may be made of at least one of Cr, V, W, Ti, Zn, Ni, Cu, Al, Au, and Mo. For another example, the protrusion 51 may include at least one of the materials forming the diffusion barrier layer 52 and the bonding layer 54, but is not limited thereto. For example, the protrusion 51 may include at least one of Ti, Au, Sn, Ni, Cr, Ga, In, Bi, Cu, Ag, Nb, Pd or Ta.

The pad 25 is electrically connected to the first electrode layer 20 and exposed to the region A1 outside the sidewall of the light-emitting structure 10. The pad 25 may be provided in one or plurality. For example, the pad 25 may be made of at least one of Au, Cu, Ni, Ti, Ti—W, Cr, W, Pt, V, Fe, and Mo.

The light transmissive layer 45 may protect a surface of the light-emitting structure 10, insulate the pad 25 from the light-emitting structure 10, and come into contact with a peripheral portion of the protective layer 30. The light transmissive layer 45 may have a refractive index less than that of the semiconductor layer constituting the light-emitting structure 10 to improve the light extraction efficiency. The light transmissive layer 45 may be made of, for example, oxide or nitride. For example, the light transmissive layer 45 may be made of at least one material selected from the group consisting of $SiO_2$, $Si_xO_y$, $Si_3N_4$, $Si_xN_y$, $SiO_xN_y$, $Al_2O_3$, $TiO_2$, and AN. The light transmissive layer 45 may be omitted according to a design. According to an embodiment, the light-emitting structure 10 may be driven by the first electrode layer 20 and the second electrode layer 50.

Features, structures, and effects described in the above embodiments are incorporated into at least one embodiment, but are not limited to only one embodiment. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to an embodiment, an optical lens may be applied to a camera flash.

According to an embodiment, an optical lens may be applied to a mobile terminal.

According to an embodiment, a light emitting module having an optical lens may be applied to a camera flash or a mobile terminal.

The invention claimed is:
1. An optical lens, comprising:
a light-transmitting first body;
an incident part including an incident surface and a concentric pattern having different radii on a periphery of the incident surface on a lower portion of the first body;
an emitting part disposed on an upper portion of the first body and configured to emit light incident on the incident part; and
a protrusion portion protruding outside the first body,
wherein the protrusion portion is disposed higher than the incident part and lower than the emitting part,
wherein the emitting part has a circular columnar shape,
wherein the emitting part has a diameter smaller than a width of the protrusion portion of the first body in a lateral direction, and wherein the protrusion portion is disposed at a region outside lateral surfaces of the emitting part and lateral surfaces of the incident part.

2. The optical lens of claim 1, wherein the incident surface includes a plurality of incident surfaces spaced from each other, the concentric pattern is disposed on an outer periphery of each of the plurality of incident surfaces, and a part of the concentric pattern is disposed between the plurality of incident surfaces.

3. The optical lens according to claim 2, wherein the incident surface includes a flat, spherical or aspherical surface.

4. The optical lens of claim 1, wherein the emitting part has a diameter equal to a diameter of the incident part.

5. The optical lens of claim 1, wherein the entire region of an upper surface of the emitting part overlaps with the incident part in a vertical direction, and
wherein the upper surface of the emitting part is spaced apart from an upper surface of the protrusion portion in a range of 0.5 mm to 0.9 mm.

6. The optical lens of claim 1, wherein an upper surface of the emitting part includes a flat, spherical or aspherical surface.

7. The optical lens of claim 1, wherein the emitting part includes an inclined surface or a stepped structure on an outer side.

8. A light emitting module, comprising:
an optical lens including a light-transmitting first body, an incident part including an incident surface and a pattern on a periphery of the incident surface under the first body, and an emitting part protruding on the first body;
a light emitting device having a second body having a cavity in which the incident part of the optical lens is disposed, a light emitting diode in the cavity, and a recess in which an outer lower surface of the first body faces a periphery of the cavity, wherein the recess includes a lateral surface extending downward from a top surface of the second body and a recess surface extending laterally from the lateral surface and disposed a prescribed distance below the top surface of the second body; and
an adhesive for bonding the outer lower surface of the first body of the optical lens to the recess of the light emitting device,
wherein the first body includes a protrusion portion which is disposed lower than the emitting part and disposed higher than the incident surface,
wherein the protrusion portion is disposed at a region outside lateral surfaces of the emitting part and lateral surfaces of the incident part, and
wherein the outer lower surface of the protrusion portion of the first body is disposed on the recess surface in the recess.

9. The light emitting module of claim 8, wherein the incident part of the optical lens has a circular columnar shape, and
wherein the protrusion portion has a different shape from a shape the emitting part.

10. The light emitting module of claim 8, wherein the incident surface of the incident part includes a plurality of incident surfaces, the light emitting diode faces each of the plurality of incident surfaces, and the plurality of light emitting diodes include a warm white LED and a cool white LED.

11. The light emitting module of claim 9, wherein the emitting part has a diameter equal to a diameter of the incident part, and the pattern is formed in a concentric convex pattern on the periphery of the incident surface.

12. The light emitting module of claim 9, wherein an outer shape of the recess corresponds to a shape of the first body,
wherein a surface area of the recess surface is between 30% to 50% of an area of the second body in a plan view.

13. The light emitting module of claim 9, wherein a case having an opening is disposed on the optical lens,
an upper surface of the first body of the optical lens is disposed on a lower surface of the case,
the emitting part of the optical lens is disposed in the opening of the case, and
wherein the upper surface of the emitting part is spaced apart from an upper surface of the protrusion portion in a range of 0.5 mm to 0.9 mm.

14. The light emitting module of claim 13, wherein an upper surface of the emitting part of the optical lens is disposed lower than an upper surface of the case.

15. A light emitting module, comprising:
an optical lens; and
a light emitting device having a plurality of light emitting diodes under the optical lens,
wherein the optical lens includes a light-transmitting first body, and an incident part having a plurality of incident surfaces facing the plurality of light emitting diodes and a concentric pattern on a periphery of each of the plurality of incident surfaces,
the light emitting device includes a second body having a cavity in which the incident part of the optical lens is disposed, a plurality of lead frames disposed on the bottom of the cavity, and a plurality of electrode pads disposed on the bottom of the second body, wherein the plurality of lead frames include a first lead frame in which the plurality of light emitting diodes are disposed and a second and a third lead frame disposed on opposite sides of the first lead frame,
the plurality of light emitting diodes emit different correlated color temperatures,
wherein the optical lens includes an emitting part protruding from the first body in a direction opposite to the incident part,
wherein the first body includes a protrusion portion which is disposed lower than the emitting part and disposed higher than the incident surface,
wherein the protrusion portion is disposed at a region outside lateral surfaces of the emitting part and lateral surfaces of the incident part,
wherein the incident part of the optical lens is disposed under an upper surface of the light emitting device, and the emitting part of the optical lens is disposed above the upper surface of the light emitting device, and
wherein the emitting part of the optical lens has a circular shape.

16. The light emitting module of claim 15, further comprising a protrusion portion disposed outside the light-transmitting first body and a recess disposed on a periphery of an upper portion of the second body of the light emitting device.

17. The light emitting module of claim 16, wherein a lower surface of the protrusion portion and an upper surface of the recess have the same shape, and the upper surface of the recess has an area between 30% to 50% of an area of the second body in a plan view, and is bonded to the lower surface of the protrusion portion.

18. The light emitting module of claim 15, wherein the plurality of light emitting diodes include a warm white LED and a cool white LED, and the plurality of light emitting diodes are individually driven.

19. The light emitting module of claim 15, wherein the cavity of the light emitting device and the incident part of the optical lens have circular shapes, wherein the protrusion portion has a different shape from a shape the emitting part and a shape of the incident part.

20. The light emitting module of claim 8, wherein the emitting part has a columnar shape.

* * * * *